Feb. 20, 1934.  H. R. PERRY  1,948,127
ART OF MANUFACTURING SHOES
Filed Feb. 24, 1933  3 Sheets-Sheet 1
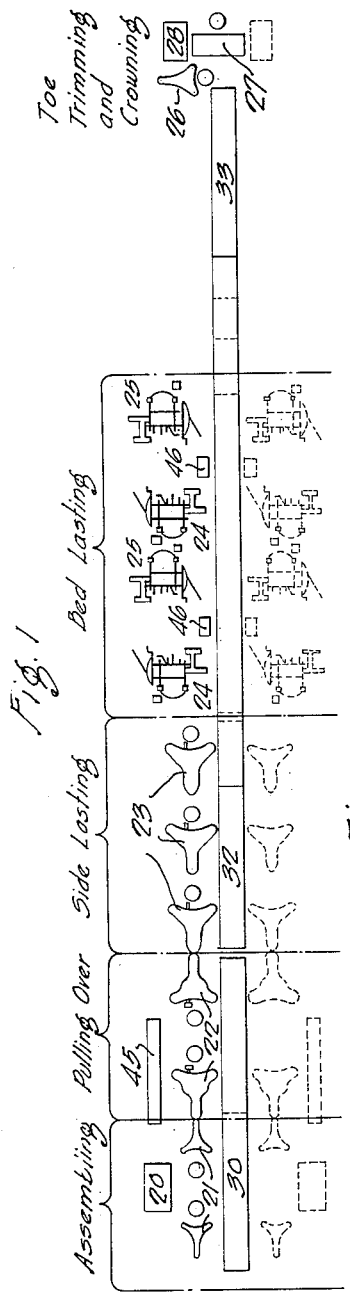
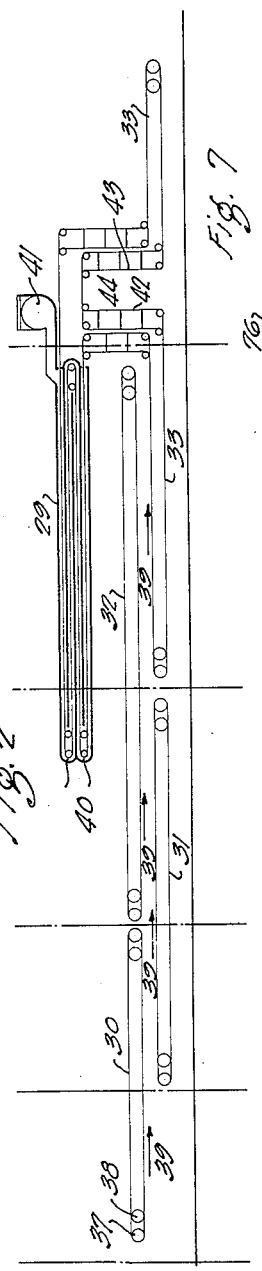
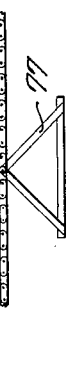
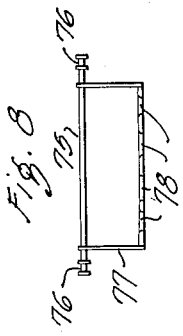
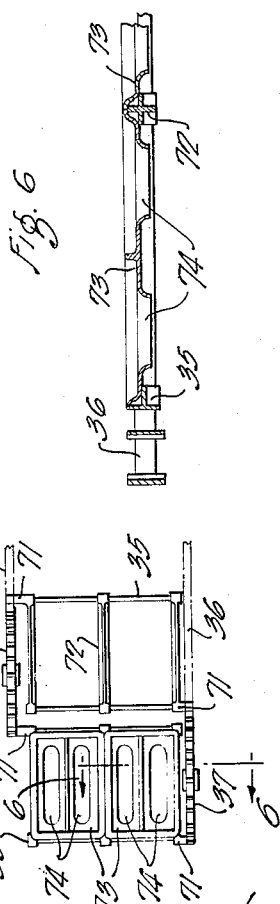
Inventor
Harold R. Perry
by Roberts, Cushman & Woodberry
Attys Feb. 20, 1934.  H. R. PERRY  1,948,127
ART OF MANUFACTURING SHOES
Filed Feb. 24, 1933   3 Sheets-Sheet 2
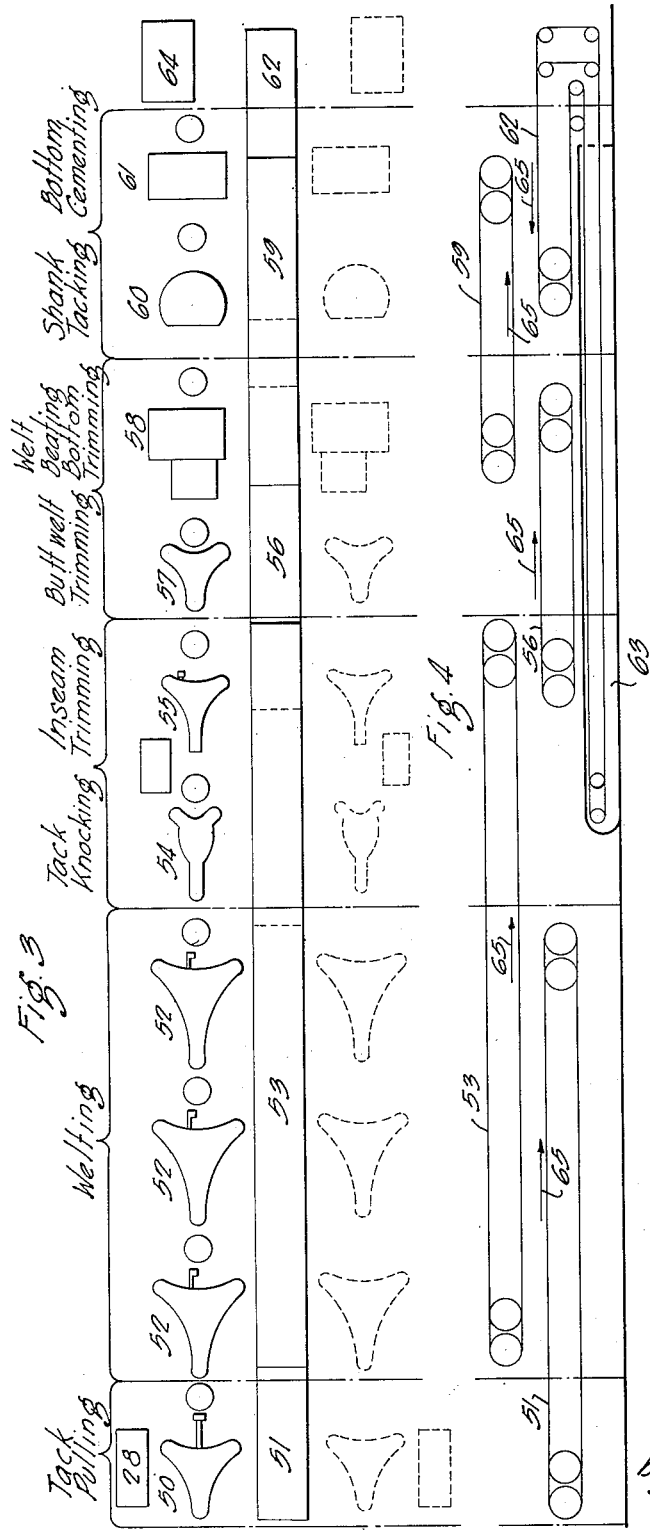
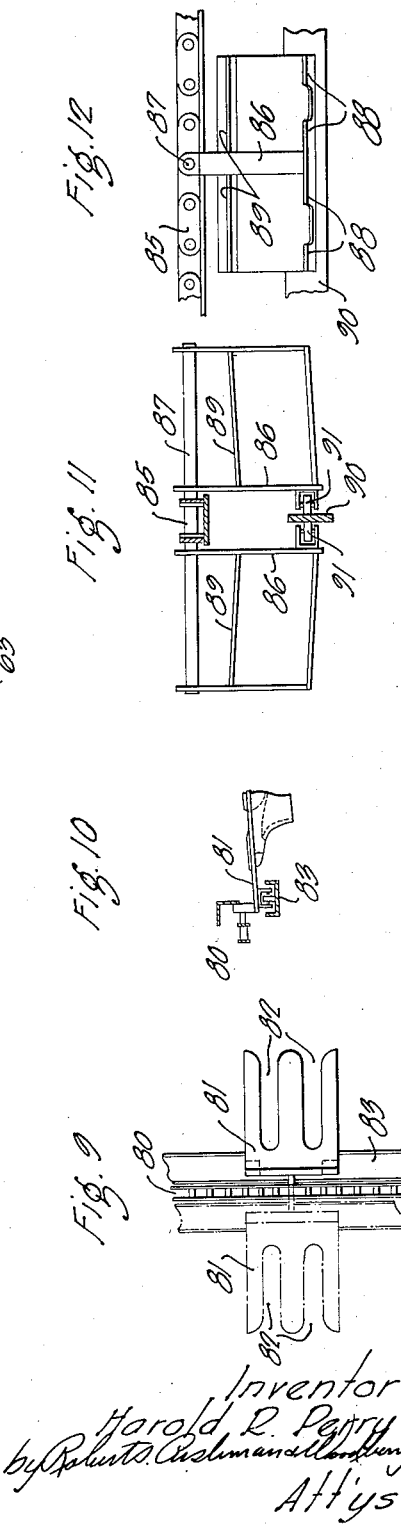
Inventor
Harold R. Perry
by Roberts, Cushman and Woodbury
Att'ys Feb. 20, 1934.  H. R. PERRY  1,948,127
ART OF MANUFACTURING SHOES
Filed Feb. 24, 1933  3 Sheets-Sheet 3
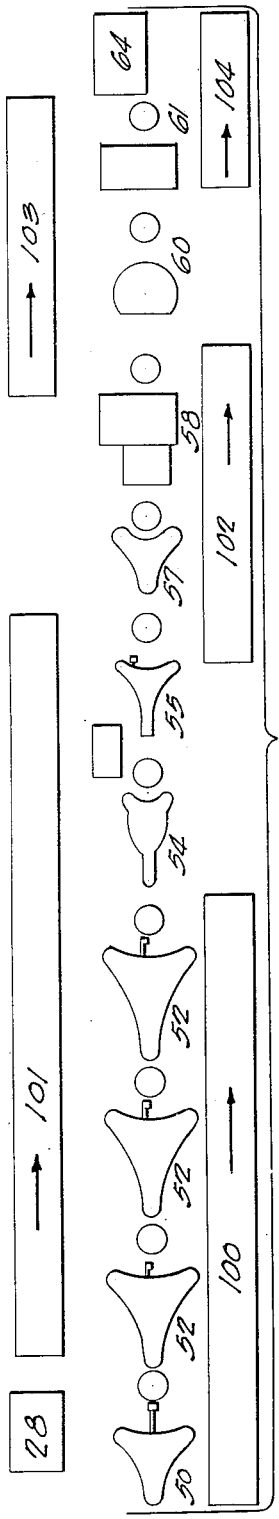
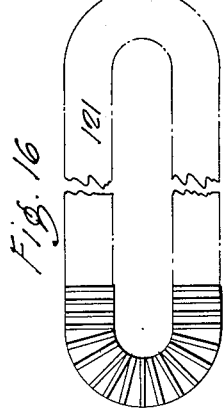
Fig. 16
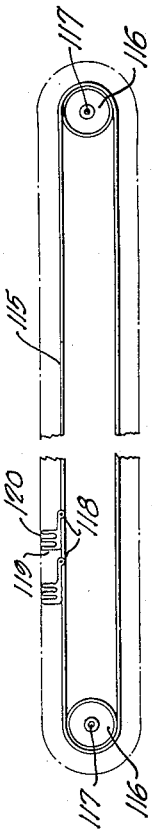
Fig. 15
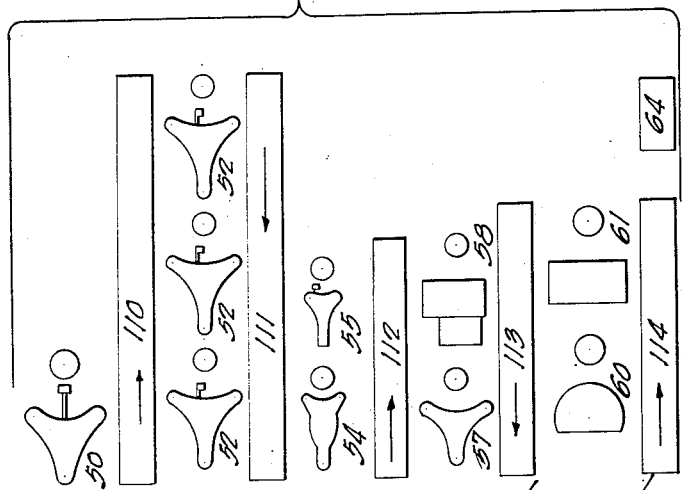
Fig. 14
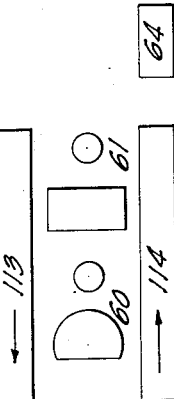
Inventor
Harold R. Perry
by Roberts, Cushman & Woodberry
Att'ys Patented Feb. 20, 1934

1,948,127

UNITED STATES PATENT OFFICE 1,948,127

ART OF MANUFACTURING SHOES

Harold R. Perry, Swarthmore, Pa., assignor to The Lamson Company, Syracuse, N. Y., a corporation of Massachusetts Application February 24, 1933. Serial No. 658,305

4 Claims. (Cl. 12—142)

This invention relates to an improvement in the art of manufacturing shoes and more particularly to the employment, in a production system of manufacturing shoes wherein a plurality of operations are performed upon the shoes by successive groups of operators, of mechanism for conveying the shoes in progress of production from one group to another group and for providing reserves, each associated with a group and easily accessible to the operators therein, of those shoes in progress which can not be immediately treated by the operators and from which the operators can draw as occasion arises.

In the manufacture of shoes it is customary to have a certain series or number of operations e. g. lasting, welting and the like performed by teams which consist of groups of operators, each group having certain definite and like operations to perform upon the shoes. Each group comprises one or more operators depending upon the time required to perform the operations assigned the group so that, as far as possible, the output of each group will be the same as that of all the other groups in the team.

The illustrated string or tandem systems in which the groups are arranged in series, and the individual stations of all the operators in each group are also arranged in a series with one another have proven by experience to be very satisfactory, being economical in the use of floor space and the operators' stations being so arranged that the foreman or inspector can quickly and easily check up on the work at any time without disturbing any other operator than the one whose work is under examination.

In the string system it has, for many years, been the practice for each operator to remove the shoes from a floor rack containing a case unit lot of shoes or shoe parts and then, after completing the operation to return them to the rack, which in due time is shifted to the station of an operator in the succeeding group where the shoes are again removed, treated and returned to the rack. The unit lots of shoes in the rack for many years in most factories, consisted of forty-eight pairs, but were later reduced by stages to unit lots of twelve pairs, which are now generally adopted as the standard, although six pair unit lots are being used in some factories. It has now been proposed to handle the shoes in unit lots of one pair each, substituting conveyors for floor racks, and the present invention has been developed with that idea in mind.

Heretofore one difficulty with the use of conveyors has been the practical impossibility of maintaining reserves from which any of the operators of a group in the team could draw in case of any delay in production by a preceding group. Another difficulty has been that where the shoes are supplied by a conveyor belt to a group consisting of a plurality of operators the operator last served must take all the shoes left on the belt whereas the other operators in the group need take shoes only as they are prepared to work upon them. The total output of the group therefore depended to a considerable extent upon the last operator who accordingly might be compelled to work under pressure during a great part of the time, particularly if another operator in the group had been delayed due to machine trouble or any other reason. Attempts have been made to overcome these difficulties by arranging the groups of operators and the operators' stations in each group according to the so-called "rink system" or by providing a plurality of conveyors separately connecting individual operators' stations in one group with individual operators' stations in the succeeding group, whereby the supply to each of the stations in the succeeding group is dependent upon the despatching operators; see for example the patent to Frost, No. 1,863,557, dated June 21, 1932 wherein the employment of a plurality of chutes in "series-shunt relation" for that purpose is set forth.

The primary object of this invention is to provide a system for manufacturing shoes of the progressive or production type wherein the shoes are operated upon by a plurality of operators arranged in groups, those in each group performing certain definite operations only, such system including overlapping conveyors by which the shoes in progress may be despatched by all the operators in one group to the succeeding group and from which the shoes may be removed when desired by any operator in such succeeding group; thus distinguishing over mechanism in which all the articles must be removed within a predetermined period by at least one operator in the succeeding group, or in which the shoes are despatched by an operator in one group to that operator in the succeeding group selected by the despatching operator to continue the work.

A further object of this invention is to provide, in such system, conveyor mechanism which will retain the shoes not removed by the operators in the group to which they are despatched and will re-present them to the operators of that group repeatedly until removed, the mechanism thus establishing a moving reserve or storage for surplus shoes between successive operation groups; and being, furthermore, flexible so that the direction of travel of the shoes transported thereby may be changed, horizontally, vertically or obliquely, in accordance with the requirements of the installation, as for example to enter floors above or below, to clear aisles, or to enter dryers either of the vertical or the horizontal type.

Other objects of the invention will appear from a consideration of the following description taken in connection with the drawings which form a part thereof and in which Figs. 1 and 2 illustrate diagrammatically in plan and elevation, respectively, a typical layout of an installation in the lasting department of a shoe factory in which this invention is employed;

Figs. 3 and 4 are views of a typical layout of a similar installation in the welt department of a shoe factory;

Fig. 5 is a plan view of a portion of one form of conveying mechanism which may be employed;

Fig. 6 is an enlarged sectional detail taken along the line 6—6 of Fig. 5;

Figs. 7 to 12 illustrate other forms of work conveying mechanism;

Figs. 13 and 14 are typical layouts of other installations in a welt department which embody this invention; and Figs. 15 and 16 illustrate other forms of work conveying mechanism applicable to carry out this invention.

The various machines used in the lasting and welt departments have been illustrated by symbols conventionally employed in the shoe art but in order to render the layouts easily understandable various indicia have been applied to the drawings.

The progress of the shoes through the lasting department will first be described without reference to the conveyor mechanism. In the selected layout, Figs. 1 and 2, one team comprises the following groups of operators; first, the assembling group consisting of two operators who take the shoe, insole and upper previously cased with the counter, from a rack 20 and assemble them with lasts at stations 21; second, the pulling-over group also consisting of two operators who pull the uppers over the lasts and tack them to the last and insole at stations 22; third, the side-lasting group consisting of three operators who work upon the machines at stations 23; fourth, the bed-lasting group consisting of four operators, two working on left shoes at stations 24, and two working on right shoes at stations 25; fifth, the toe-trimming and crowning group consisting of two operators one trimming the toes at station 26 and the other crowning the shoes at station 27 and placing them in the floor rack 28 for transfer to the welt department.

Following the operations of the bed-lasting group the partially completed shoes may be dried to exhaust the moisture from the uppers so that they will fit more closely to the lasts. The dryer 29 here illustrated is of the tunnel design supported overhead to conserve floor space and through which the shoes are conveyed by the mechanism to be described.

The layout above described was selected as a typical example of the layouts in many shoe factories. As pointed out above the transportation of shoes from group to group has heretofore usually been by floor racks which are pushed or pulled from group to group. One feature of this invention is the inclusion in the layout of a novel arrangement of conveyor mechanism which takes the place of the floor racks. The conveyor mechanism here shown consists of a plurality of conveyors, each conveyor transporting the shoes from one group to another. This is shown particularly in Fig. 2 wherein are set forth conveyors of the belt or chain type, 30, 31, 32 and 33, continuously traveling in the directions of the arrows, the conveyor 30 spanning the assembling and pulling-over groups, the conveyor 31 spanning the pulling-over and side-lasting groups, the conveyor 32 spanning the side-lasting and bed-lasting groups, and the conveyor 33 spanning the bed-lasting and the toe-trimming and crowning groups. The various conveyors thus described overlap in a vertical plane and shoes supplied to one group of operators by one conveyor are transported from that group to the succeeding group by another conveyor.

The shoes transported are kept at all times substantially in a horizontal position as by the employment of a plurality of racks 35 supported at two diametrically or diagonally located corners upon chains 36 (see Figs. 5 and 6). The chains 36 are respectively supported upon pulleys or sprockets 37 and 38, driven simultaneously by any well known means (not shown) in the respective directions indicated by the arrows 39 (Fig. 2). The pulleys or sprockets 37 and 38 are offset or positioned one in advance of the other to accommodate the diagonally positioned corner supports of the racks, which remain level or right side up throughout their travel, whether on horizontal runs or vertical runs of the conveyor, or passing around the pulleys. Hence shoes placed thereon are not thrown off irrespective of the course of travel of the conveyor. The conveyor 33 also travels through the dryer 29 which as here shown comprises a plurality of horizontal, vertically spaced compartments 40, to which heated air is delivered from a blower 41. The vertical runs 42 and 43 of the conveyor 33 are shown separated for the purpose of providing an aisle 44.

The lasting operation with the layout illustrated and described will now be briefly set forth. Each operator in the first group, after assembling a pair of shoes, places them on one of the empty racks 35 which is passing his station on the lower run of conveyor 30. The racks pass conveniently near the operators of the second group and either operator of that group may take a pair from a rack, pull over the uppers, adding at the same time toe caps taken from a container 45, and place the shoes upon an empty rack 35 on the upper run of the conveyor 31. The shoes are similarly removed from the conveyor 31 by an operator in the side-lasting group, treated and then placed upon an empty rack 35 in the lower run of the conveyor 32. The pair of shoes removed from the rack of conveyor 32 by an operator in the bed-lasting group are placed upon a table or bench 46 and when the left and right shoes have been treated the pair is placed on an empty rack in the upper run of the conveyor 33 and carried through the dryer 29 to the last group where the toes are trimmed and crowned.

It will be noted that in case none of the operators of the group to which the shoes were despatched by a conveyor should remove the shoes, they will be recirculated and again presented to the receiving group, a procedure which obviously will continue until the shoes are removed. Thus a reserve or storage for surplus shoes is provided by each conveyor which is repeatedly made accessible to the operators so that they will not be compelled to be idle for any substantial period. The advantage of thus providing a reserve of surplus shoes, movable in a closed circuit and brought directly to the operators repeatedly, is particularly obvious when it is considered that heretofore it has been necessary for a boy, or for the operator himself, leaving his station, to find a floor rack of shoes in condition for further treatment and push or drag it to the station.

At the completion of the operations of the lasting room the shoes are placed on a floor rack 28 and transported to the welt department or the shoes might be transported from the lasting department to the welt department by any suitable form of mechanical conveyor.

The layout of the welt department, shown in Figs. 3 and 4, is in many respects similar to the layout of the lasting department and accordingly the progress of the shoes therethrough will be described briefly without any detailed description of the mechanism employed.

The rack 28 is moved to the first group, which comprises in this instance a single operator at station 50 who pulls out of the shoes such tacks as will interfere with the welt stitching operation. The tack puller then places the shoes on the upper run of a conveyor 51, which transports them to the second group consisting of three operators, who sew the welts to the uppers at stations 52 and then place the shoes on the lower run of the conveyor 53. This conveyor transports the shoes to a group comprising two operators, a tack knocker and an inseam trimmer. The tack knocker removes the shoes at station 54, knocks certain tacks to an inclination which increases the tension of the upper and then returns them to the lower run of the conveyor 53 by which they are advanced to the other operator of this group who trims the inseams at station 55 and then places the shoes on the upper run of the conveyor 56. The group which the conveyor 56 supplies comprises a butt welter who trims the welt at the instep at station 57 and an operator at station 58 who beats the welt and then fills the bottoms of the shoes with shoe-bottom filler. The butt welter may return the shoes to the upper run of conveyor 56 from which they are again removed by the bottom filler or he may pass the shoes directly to the second operator. When the bottoms have been filled the shoes are placed upon the lower run of the conveyor 59 by which they are carried to a group comprising two operators, a shank tacker at station 60 and a bottom cementer at station 61. The shank tacker removes the shoes from the conveyor 59 and either returns them thereto or else places them directly on the bench at station 61. The bottom cementer after completing that operation places the shoes on the upper run of the conveyor 62. In accordance with the practice common in shoe factories the shoes are then conditioned to render the cement tacky. In the present instance the shoes are carried by the conveyor 62 through a dryer 63, and then delivered to an operator who removes and places them in the floor rack 64. The arrows 65 indicate the directions of travel of the various conveyors.

In Figs. 1 and 3, second teams of operators are indicated in dotted lines and the conveyors are shown as traveling between the teams and transporting the shoes between the adjacent groups of both teams.

The invention has been shown and described in detail as directed to the manufacture of shoes. It will be understood, however, that the manufacture of shoes was selected as an illustration of the invention and that the invention is applicable to other manufacturing of that class which employs a production or progressive system in which the articles are made in a series of stages by operators arranged in groups to form teams.

Various forms of conveyor mechanisms may be employed by which the shoes are maintained in the same position at all times during their travel, whether traveling on horizontal runs of the conveyor, or on vertical runs, or around pulleys. Figs. 5 and 6 show in detail the rack 35 previously mentioned provided with sockets at diametrically opposite corners, which receive pins 71 carried by and projecting from the chains 36. The rack 35 is divided by a bar 72 into two compartments which receive saddles or trays 73 each having a pair of apertures 74 which support the lasted shoes in the inverted position. The saddles 73 are readily removable and the particular form shown may be replaced by other forms which may or may not include apertures according to the shape and size of the articles being transported and the manner in which they are to be supported.

In place of the racks just described, which are maintained substantially parallel to and in the plane of the horizontal runs of the conveyor, there may be used racks which are suspended below such plane, as for example the structure illustrated in Figs. 7 and 8. Swung from rods 75, supported at its ends on a pair of chains or strands 76, are racks 77 having at one or both sides openings 78 into which the inverted lasts may be inserted by the operators and from which they may readily be removed.

Conveyor systems of the single chain or strand type may be employed under certain conditions. Figs. 9 and 10 illustrate, in plan and cross section respectively, one such system which comprises sections each having a single strand chain 80 from which project at one or both sides pivotally supported racks 81 having suitably formed apertures in which the lasted shoes are placed, as for example, the recesses 82. In order to steady the racks guide troughs 83 may be provided. A similar construction illustrated in Figs. 11 and 12 comprises a single strand chain 85 from which the racks 86 are suspended by a rod 87 projecting at both sides. The rack comprises suitably spaced flanges 88 on which the lasted shoes are supported preferably in the inverted position as shown. Above the flanges is a shelf 89 on which shoe parts or other articles may be placed if desired. The weight of the rack with or without the lasted shoes will hold the flanges 88 in substantially horizontal planes throughout its course of travel but a guide plate 90 may also be provided along the horizontal runs against which rollers 91 on the racks will bear.

In the foregoing description reference has been made specifically to racks with or without saddles adapted to receive and support lasted shoes in the inverted position. However, other forms of supporting means, as for example baskets or trays, might be employed and it will be understood that the reference to such racks does not thereby limit the invention to the particular form of rack or to its use in the handling of lasted shoes alone.

Under certain conditions it may be desirable, for one reason or another, to arrange successive conveyors on opposite sides of the operators. In this arrangement the conveyors, instead of overlapping one another in a vertical direction, overlap one another in a horizontal direction. Fig. 13 illustrates a layout of a welting department wherein this arrangement is carried out, the conveyor by which the shoes are despatched to any group being at one side of the operators' machines and the conveyor by which the shoes are despatched from that group to the succeeding group being at the other side of the machines. Thus the shoes placed on any rack of conveyor 100 by the tack puller at station 50 are delivered to the group of welters at stations 52 and after treatment are placed upon a rack of conveyor 101. The shoes are similarly carried along the line by the conveyors 102, 103 and 104 from each group to the next.

Fig. 14 illustrates in plan view another layout of the welting department in which the groups are arranged in parallel lines. The conveyors 110, 111, 112, 113 and 114 function in the same manner as do the corresponding conveyors 100, 101, 102, 103 and 104 in the layout shown in Fig. 13, the direction of travel of the several conveyors being indicated by arrows. The conveyors may be such as those previously shown and described where the operators are arranged in a single line.

Instead of conveyors having upper and lower runs, conveyors traveling in a single horizontal plane may be employed, as for example that illustrated in plan view in Fig. 15. There the chain strand 115 travels around horizontal spockets 116 mounted upon vertical shafts 117, and is provided with vertically extending pins 118 upon which the racks 119 are pivoted. The racks 119 are here shown as provided with recesses 120 in which the lasted shoes are inserted. Fig. 16 illustrates another form of horizontal conveyor which may be of the well known live roll type. The shoes may be placed directly upon the surfaces 121 of the conveyors or removable racks may be provided to carry the shoes.

It will be noted that the groups of stations and operators are arranged in series (although not necessarily in a straight line) and that the individual stations in each group are also preferably arranged in series with one another; that each conveyor spans two groups of stations and each conveyor overlaps each adjacent conveyor of the series, either vertically or sidewise, the overlapping portions of each overlapping pair being adjacent and readily accessible to all the stations of the same single group; that each conveyor is adjacent and accessible to all the stations of two consecutive groups; that each conveyor is positioned and arranged to receive the work from any and all the stations of one group and to transport the work to any and all the stations of the next succeeding group; that the work is brought to the operators of each group by one conveyor and despatched therefrom to the next succeeding group by another conveyor; that each conveyor moves in a closed circuit and constitutes a traveling or movable storage device for a reserve supply of work, by which the work placed thereon by an operator in the preceding group is repeatedly presented and re-presented to the operators of the receiving group until all has been removed by that group; and that the racks on which the work is carried are so supported on the conveyor that they always maintain their position right side up irrespective of changes in course of the conveyor.

While certain embodiments of the invention have been shown and described I am not limited thereto since other embodiments may be made without departing from the spirit and scope of the invention as set forth in the following claims.

I claim:

1. The art of manufacturing shoes wherein the shoes are progressively assembled by operators at stations arranged in groups, the groups being arranged in series, certain operations only being performed upon the shoes in each group, which comprises transporting the shoes from all the stations of one group to any station in a second group in a fixed path by means of a conveyor which is common to all the stations of both groups and which spans only said two groups and insures the receipt of shoes only from the first group and limits the advance of the shoes to the second group, and transporting the shoes from all the stations of the second group to any station in a third group in a fixed path by means of a separate conveyor which is common to all the stations of both the second and third groups.

2. The art of manufacturing shoes wherein the shoes are progressively assembled by operators at stations arranged in groups, the groups being arranged in series, and the stations in the groups being also arranged in series, certain operations only being performed upon the shoes in each group, which comprises transporting the shoes from all the stations of one group to any station in a second group in a fixed path by means of a conveyor which is common to all the stations of both groups and which spans only said two groups and insures the receipt of shoes only from the first group and limits the advance of the shoes to the second group, and transporting the shoes from all the stations of the second group to any station in a third group in a fixed path by means of a separate conveyor which is common to all the stations of both the second and third groups.

3. The art of manufacturing shoes wherein the shoes are progressively assembled by operators at stations arranged in groups, the groups being arranged in series, certain operations only being performed upon the shoes in each group, which comprises transporting the shoes from all the stations of one group to any station in a second group in a fixed path by means of a conveyor which is common to all the stations of both groups and which spans only said two groups and insures the receipt of shoes only from the first group and limits the advance of the shoes to the second group, and transporting the shoes from all the stations of the second group to any station in a third group in a fixed path by means of a separate conveyor which is common to all the stations of both the second and third groups, and which spans only said second and third groups and insures the receipt of shoes only from the second group and limits the advance of the shoes to the third group.

4. The art of manufacturing shoes wherein the shoes are progressively assembled by operators at stations arranged in groups, the groups being arranged in series, certain operations only being performed upon the shoes in each group, which comprises transporting the shoes from all the stations of one group to any station in a second group in a fixed path by means of a conveyor traveling in a closed circuit common to all the stations of both groups and spanning only said two groups, causing all shoes which are not removed from the conveyor at a station of the second group to be re-circulated and re-presented to the stations of the second group, and transporting the shoes from all the stations of the second group to any station in a third group in a fixed path by means of a second conveyor which is common to all the stations of both the second and third groups.

HAROLD R. PERRY.